Sept. 4, 1934.  O. BARNACK  1,972,640
PHOTOGRAPHIC CAMERA
Original Filed July 13, 1932

INVENTOR
Oskar Barnack
BY
ATTORNEY

Patented Sept. 4, 1934

1,972,640

UNITED STATES PATENT OFFICE 1,972,640

PHOTOGRAPHIC CAMERA

Oskar Barnack, Wetzlar, Germany, assignor to Ernst Leitz, Optische Werke, G. m. b. H., Wetzlar, Germany Original application July 13, 1932, Serial No. 622,183. Divided and this application March 15, 1934, Serial No. 715,622. In Germany January 22, 1932

2 Claims. (Cl. 88—2.6)

This invention relates to improvements in distance meters for photographic cameras with a range finder combined therewith, as for instance described in my co-pending application Serial No. 622,183 filed July 13, 1932 of which this is a division, and it is the principal object of my invention to provide an instrument in which the optical axes of both instruments are separated from one another, while the sight openings are so closely arranged, that a simple movement of the eyes is sufficient to observe both openings successively, thus avoiding the necessity of moving the head or adjusting the distance meter or range finder.

When making photographic pictures in a hurry it is frequently troublesome to first measure the distance and then to attempt to find the range by a lateral movement of the head or lateral displacement of the camera. It will be evident that a device which requires simply a slight movement of the eyeball in order to enable to survey in quick succession the sight openings, must be considered a vital and useful step forward in the art of great importance.

These and other objects and advantages of my invention will become more fully apparent as the description thereof proceeds, and will then be specifically defined in the appended claims.

In the accompanying drawing forming a material part of this disclosure:

As shown, in the box $e$ immediately in front of the ocular $c$ of the range finder $d$ a reflecting prism $f$ is arranged with its ray guiding part and between ocular and distance meter $a$, $b$, so that the light rays from the distance meter are guided through a sight opening $g$ in the shutter of the range finder.

Figure 1:
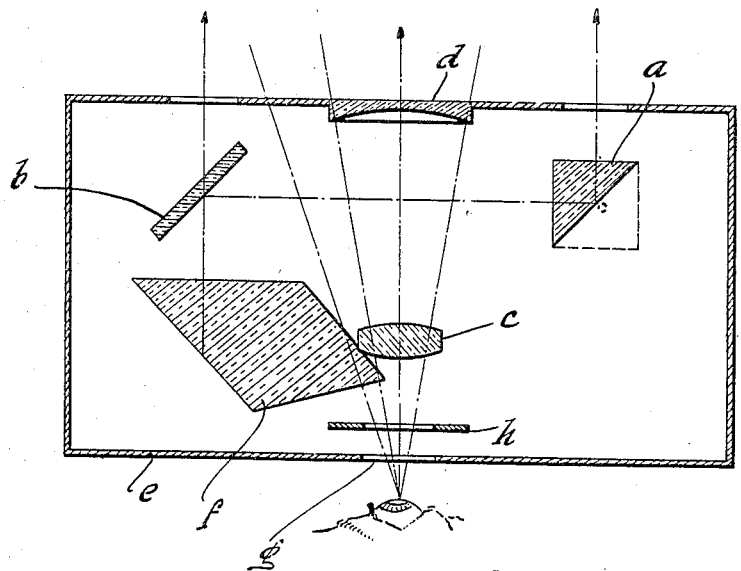
Fig. 1 is a sectional elevation of a casing embodying my invention.
Figure 2:
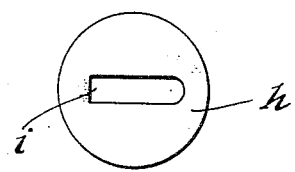
Fig. 2 is an elevation of a reflecting prism used with my invention.
Figure 3:
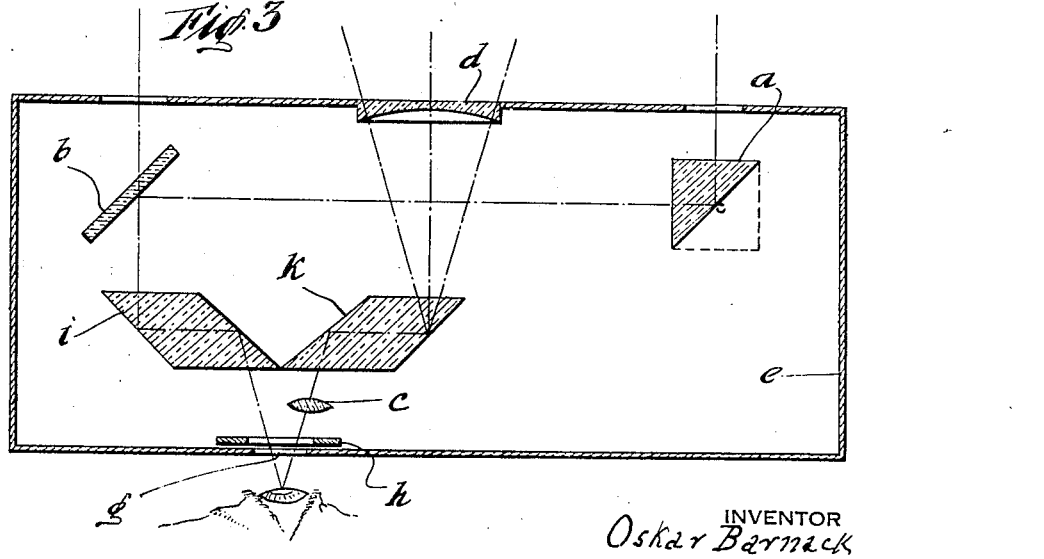
Fig. 3 is a view similar to Figure 1 of a modification of my invention.

In Figure 3, the box $e$ containing the distance meter $a$, $b$, and the range finder $d$ an ocular $c$ has the double reflecting prisms $i$, $k$, arranged between ocular $c$ and distance meter and range finder, so that the light rays are guided through a right sight opening $g$ of the shutter $h$.

In use, it will be possible to observe both sight openings of distance meter and range finder successively by a single turn of the eyeball without the necessity of turning the head to observe the picture range after measuring the distance.

It will be understood that I have described the preferred form of my invention only as one example of the many possible ways to practically construct the same and that I may make such changes as come within the scope of the appended claims in my device, without departure from the spirit of my invention and the principles involved.

Having thus described my invention, what I claim as new and desire to secure by Letters Patent is:

1. A combined distance meter and view finder with its ocular comprising a box having a sight opening, a reflecting prism near the ocular of the view finder with its ray guiding part between said ocular and the mirrors of the distance meter, a shutter having a sight opening for said view finder, in front of the sight opening in said box, said reflecting prism guiding the light rays from the distance meter through the sight opening of the shutter of the view finder.

2. A combined distance meter and view finder with its ocular, comprising a box having a sight opening for the view finder, a pair of double reflecting prisms on a common basis between said ocular and distance meter, a shutter having an opening in front of the sight opening of said box for guiding the light rays through the sight openings of shutter and view finder.

OSKAR BARNACK.